United States Patent [19]

Soda

[11] Patent Number: 5,246,540
[45] Date of Patent: Sep. 21, 1993

[54] APPARATUS AND METHOD FOR ETCHING GLASS

[75] Inventor: Ken Soda, Chicago, Ill.

[73] Assignee: Tru Vue, Inc., Chicago, Ill.

[21] Appl. No.: 861,760

[22] Filed: Apr. 1, 1992

[51] Int. Cl.⁵ .................. B44C 1/22; C03C 15/00; C03C 25/06
[52] U.S. Cl. .................. 156/663; 156/345; 156/654
[58] Field of Search .................. 156/654, 663, 345; 65/31; 252/79.2, 79.3

[56] References Cited

U.S. PATENT DOCUMENTS

| | | | |
|---|---|---|---|
| 4,427,488 | 1/1984 | Servais et al. | 156/663 |
| 4,505,781 | 3/1985 | Cozac et al. | 156/663 X |
| 4,624,729 | 11/1986 | Bresciani et al. | 156/345 |
| 4,797,316 | 1/1989 | Hecq et al. | 428/167 |
| 4,882,214 | 11/1989 | Hecq | 428/141 |

OTHER PUBLICATIONS

Burkle advertisement for "Lacquer Curtain Coding Machines", six pages.
Burkle advertisement for "Lacquer Curtain Coding Machine LZE80" two pages.
Black Bros. Roll Coders Catalog, pp. 2–12, copyright 1985.

Primary Examiner—William A. Powell
Attorney, Agent, or Firm—Robert E. Browne; Thomas C. McDonough

[57] ABSTRACT

A method of etching a glass sheet using a curtain coater includes supporting the sheet at its periphery and in a generally horizontal position such that it may sag under its own weight. Sagging causes the uppermost surface of the glass sheet to assume a generally concave form. Etchant solution applied to the uppermost surface flows over the glass to form a nonuniform layer on the uppermost surface. The layer has a minimum thickness at the periphery of the glass sheet. Etchant solution is applied to the glass using a curtain coater designed to handle a corrosive etchant solution. The sheet of glass is supported on a frame including a seal to prevent etchant solution from contacting a second surface of the glass.

17 Claims, 8 Drawing Sheets

APPARATUS AND METHOD FOR ETCHING GLASS

BACKGROUND OF THE INVENTION

The present invention relates in general to a method for reducing reflection from a glass surface by etching. It relates in particular to a method for applying an etchant to one surface of a sheet of glass.

It is well known that reflected glare from a glass surface may be reduced by etching the glass surface. A widely used method for etching a glass surface comprises immersing a sheet of glass in an etchant solution, usually including hydrofluoric acid. Using such a method, an etched glass sheet may be prepared in about 20 seconds.

An etched glass surface has reduced glare because light incident on the surface is reflected from the surface diffusely; that is, the light is reflected in all directions, even though it may have been incident from only one particular direction. An observer may observe the diffusely reflected light from only one direction at a time. As such, only a portion of the diffusely reflected light may be observed at a given instant. This creates the illusion of reduced reflection.

Etched glass is widely used for low-glare glazing because it is relatively inexpensive. An etched glass surface, however, may also diffuse a portion of light transmitted through the surface. As a result of the light diffusion, an observer viewing an object through an etched glass surface may be unable to resolve certain details of the object.

Immersion methods for etching a glass sheet usually provide a sheet etched on two opposite surfaces. Sheets thus produced may have limited use as cover glasses for art and photograph framing because of resolution loss due to surface diffusion. Immersion methods for etching a sheet of glass may also provide an etched surface which has a nonuniform etch. This may be due to an inability to immerse and remove a glass sheet in an etchant solution in a time period sufficiently short compared with the time required to provide an acceptable etch. A nonuniformly etched surface, however effective in reducing glare in general, may appear cosmetically unacceptable.

It is well known that a sheet of glass etched on one surface only may be as effective as a low-glare glazing for art works as a sheet etched on both surfaces. It is also well known that a one-side-etched sheet provides less distortion of art works viewed through the sheet. Immersing a sheet of glass in an etchant solution may be an unsuitable method for cost effective production of a one-side-etched sheet of glass, because one surface of the sheet must be protected during immersion in the etchant solution.

A method for modifying the light reflecting properties of one surface of glass is disclosed in U.S. Pat. No. 4,427,488, the text of which is hereby incorporated by reference. A method is disclosed whereby an etchant solution may be applied to a glass surface held in a horizontal position. It is disclosed that an etchant solution may be applied to the surface by passing it beneath a roller to which the etchant solution may be continually applied, a method generally known as roll coating. It is also disclosed that the etchant solution may be applied by passing the glass sheet below a trough containing the etchant solution. The trough has a slit in its base to allow etchant solution to flow from the trough. The glass sheet may be transferred below the slit on a series of rollers. Such a method is generally known as curtain coating. The curtain coating method applied to etching may be referred to as curtain etching.

In practice it may be very difficult to adapt a glass etching process for curtain coating, i.e. for curtain etching. Commercially available curtain coating apparatus is generally designed for use with viscous liquids, such as paints or adhesives. The apparatus is generally equipped with a pressurized liquid pumping system for forcing the viscous liquid through a slit to form a thin coating film. If leaks or breakages occur in a pressurized liquid pumping system, caustic etchant solution may be sprayed on persons or objects in the vicinity of the apparatus.

Etching solutions described in U.S. Pat. No. 4,427,488 are aqueous acid solutions and, as such, are not particularly viscous. Nonviscous liquids may form only a very thin layer on a glass sheet. Plate glass as received from a manufacturer is generally not exactly flat. It has been found that an aqueous etchant solution applied a surface of a nonflat sheet may form pools in some parts of the sheet, and in other parts may not cover the sheet sufficiently to provide a desired degree of etch. As a result, a nonflat sheet may not be uniformly etched.

Further, it is taught in U.S. Pat. No. 4,427,488 that a glass sheet should be positioned less than one millimeter below a slit delivering etchant solution to the sheet. This may also present problems in processing glass sheets which are not exactly flat, as the flatness variation of a sheet may be more than half of the gap between the slit and the sheet.

It has also been found difficult to prevent etching solution from reaching the downward facing surface of a sheet of glass. Etching solution flows over the edges of the sheet in sufficient quantity that etching occurs at least at the edges of the downward facing surface. Etching solution is also quickly transferred to rollers on which the glass sheet is transported. Etchant may thus be transferred from the rollers to the surface of the sheet resting on the rollers, i.e., the downward facing surface. Even fumes of the etching solution have caused etching on the downward facing surface of the sheet of glass.

Accordingly, it is an object of the present invention to provide a curtain etching method which may provide an etched surface on one surface of a sheet of glass.

It is another object of the invention to provide an apparatus for carrying out the curtain etching method wherein a glass sheet may be etched on one surface only while minimizing marring to the other surface due to stray etchant solution and etchant fumes.

It is a yet another object of the present invention to provide a curtain etching apparatus which does not require a pressurized pumping system.

It is still another object of the present invention to provide a curtain etching apparatus which may be used with nonflat sheets of glass It is a further object of the present invention to provide apparatus for preventing etching solution and fumes thereof from reaching one surface of a sheet of glass.

SUMMARY OF THE INVENTION

The present invention is directed to apparatus and a method for etching one side of a sheet of glass. The glass sheet is held in a generally horizontal position while it is being etched. The apparatus includes a coating head for applying an etchant solution to the surface. The coating head includes a deep elongated trough for containing the etchant solution The trough has a base which includes an elongated slit through which the etchant solution may flow.

The apparatus also includes a transport system for transporting a sheet of glass beneath the coating head for receiving etchant solution flowing from the slit. The glass sheet is transported in a direction generally perpendicular to the trough, preferably at a distance between about three and six inches below the slit.

The transport system includes a rack for carrying a sheet of glass to be etched in a generally horizontal position with a surface to be etched uppermost and an opposite surface facing downward. The rack includes a flexible, generally rectangular seal having similar dimensions to the sheet of glass. The sheet of glass may be placed on the rack supported at its periphery by contact with the seal. Etchant solution flowing over the uppermost surface of the glass sheet may thus be prevented from reaching the downward facing surface. A solid cover on the base of the rack may be provided to prevent etchant fumes from reaching the downward facing surface.

A sheet of glass placed on the rack may also sag under its own weight such that the uppermost surface assumes a generally concave form. Etchant flowed onto the surface of the sheet thus forms a nonuniform layer or pool having its greatest depth at about the center of the sheet.

A method for etching a sheet of glass includes using the above described apparatus to flow an etchant solution onto the glass for forming a layer thereon having a nonuniform thickness. The etchant solution has a viscosity sufficient that the layer has a minimum thickness sufficient to etch the glass to a predetermined degree, but not sufficient to prevent the etchant solution from flowing over the glass sheet to form the nonuniform layer.

BRIEF DESCRIPTION OF THE DRAWING

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
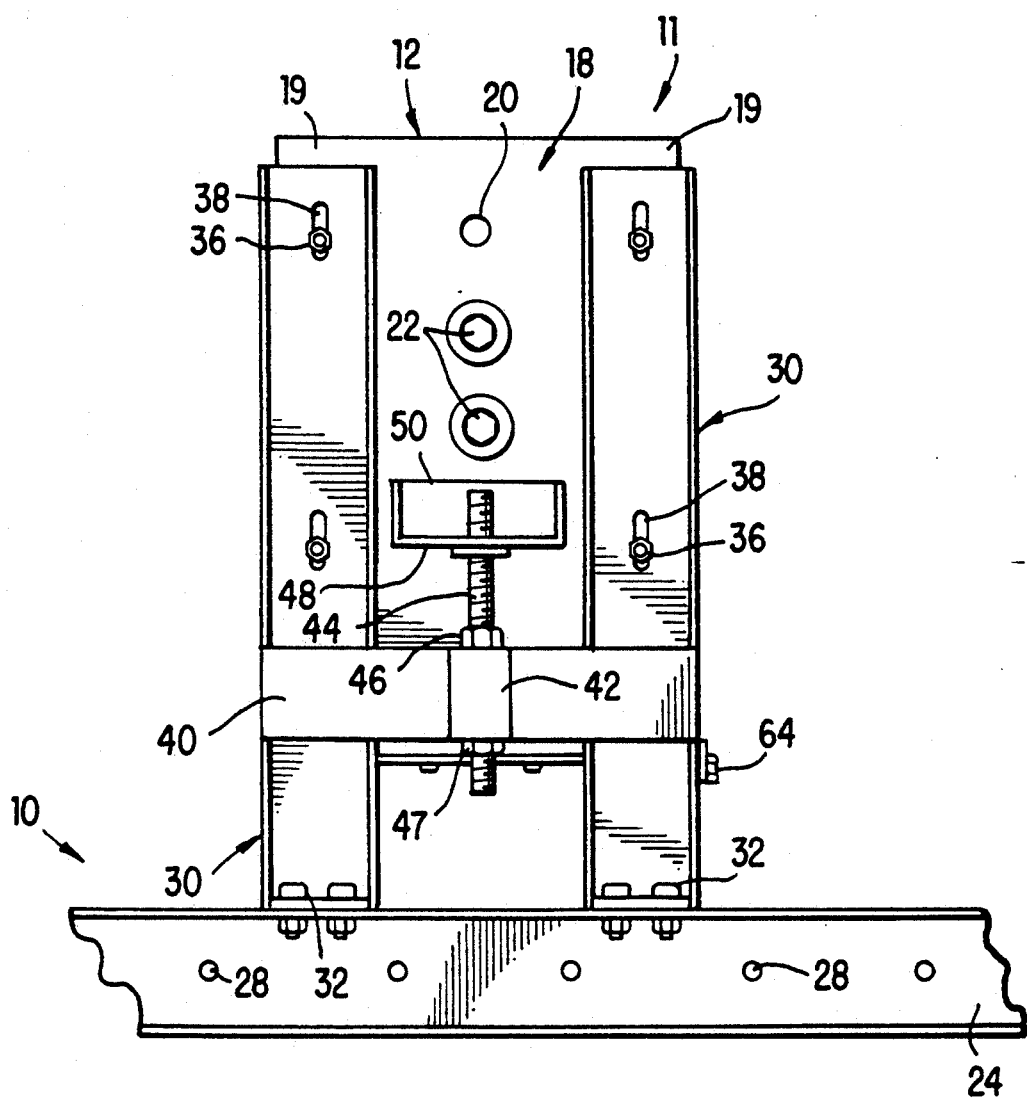
FIG. 1 schematically illustrates a side elevation view of curtain etching apparatus according to the present invention.
Figure 2:
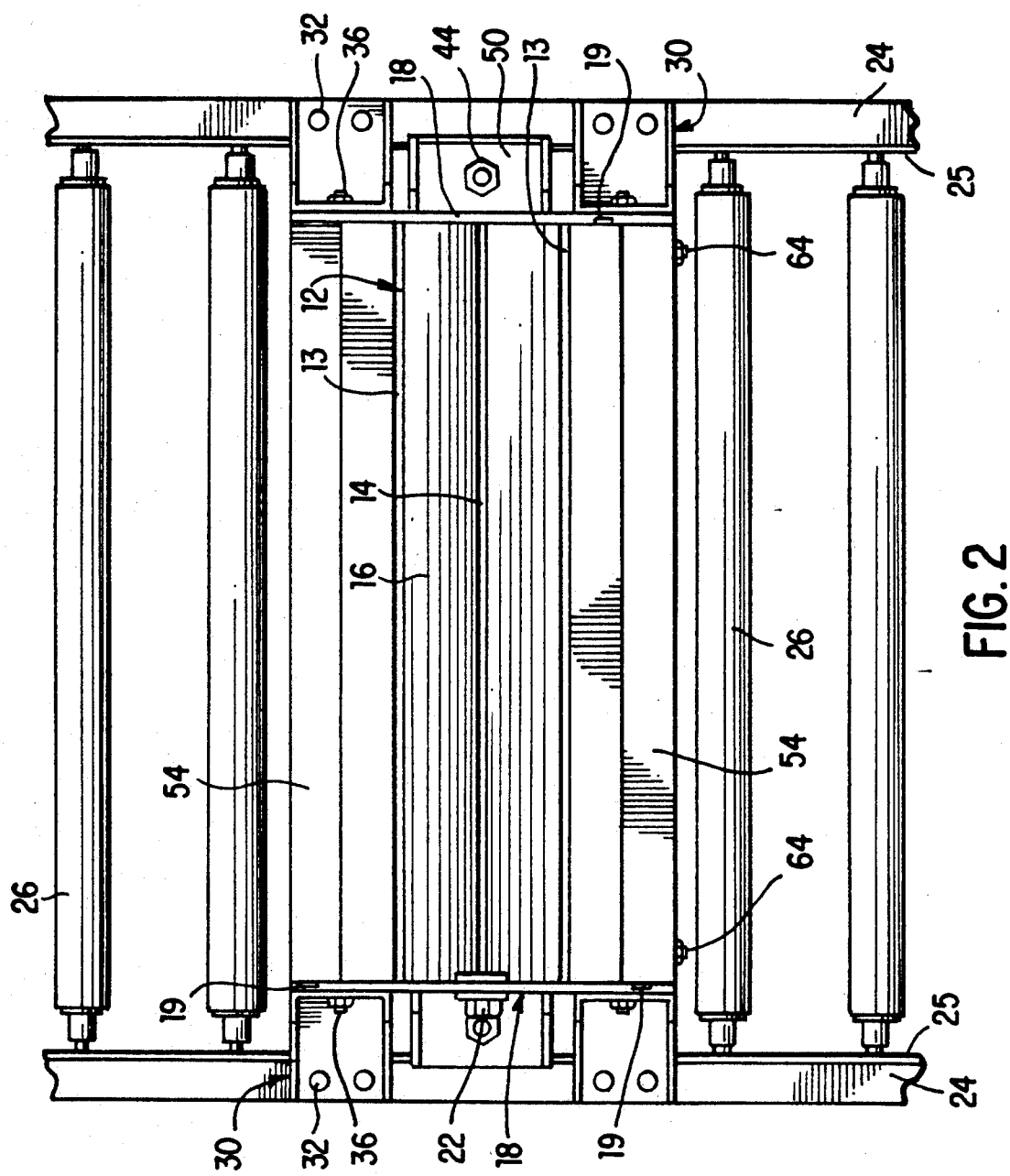
FIG. 2 schematically illustrates a plan view of curtain etching apparatus according to the present invention taken in the direction 2—2 of FIG. 1.
Figure 3:
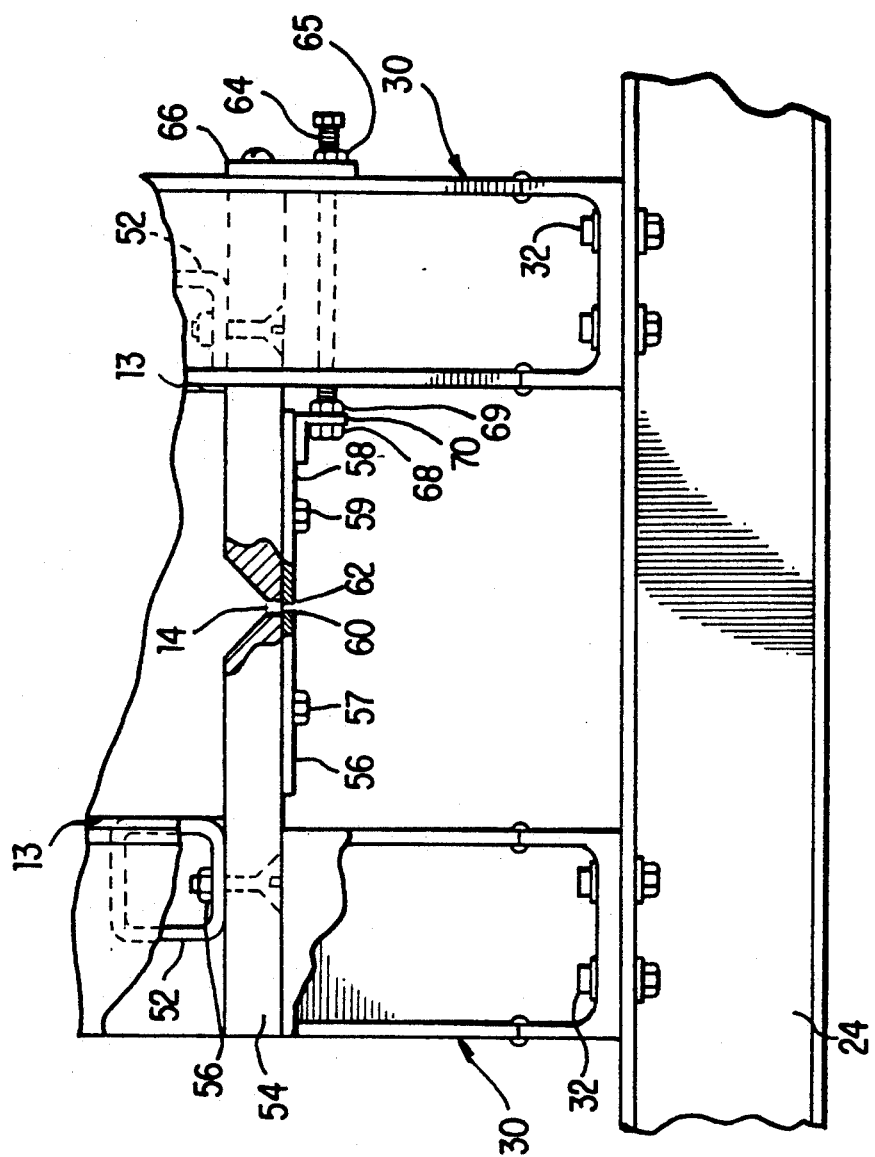
FIG. 3 is an enlarged view schematically illustrating details of a slit adjusting arrangement of the apparatus of FIG. 1.

Turning now to the drawings, FIGS. 1, 2, and 3 illustrate a curtain etching apparatus designated by the general numeral 10 including a coating head, designated by the general numeral 11, for applying an etchant solution to a sheet of glass to be etched. The coating head 11 includes an elongated trough member 12 having a slit 14 extending along the length of a base 16. Trough member 12 is preferably about thirty inches deep. Trough member 12 includes end-walls 18. At least one of end-walls 18 may include at least one aperture 20 for controlling the depth of a liquid in trough member 12. An end wall 18 may, for example, include three apertures disposed at different heights therein. The apertures may be closed by plugs 22 removeably inserted therethrough As such, the depth of etchant solution in trough member 12 may be varied, to vary the pressure of the etchant on base 16 and slit 14, and thus provide a means of varying the flow of etchant therethrough. Trough member 12 is preferably constructed from a material resistant to etching solutions containing hydrofluoric acid, for example polypropylene.

A system for transporting glass sheets to be etched includes two generally parallel, spaced-apart side members 24. Side members 24 may have a polypropylene layer 25 thereon, to protect them from corrosion by etchant solutions. Rollers 26 mounted in bearings 28 extend between side members 24. Coating head 11 may be supported above rollers 26 between support members 30. Support members 30 extend vertically upward from side members 24 and are attached by bolts 32 thereto.

End-walls 18 of trough member 12 include extended portions 19. Extended portions 19 may be attached to support members 30 by bolts 36 extending through elongated slots 38 therein. Elongated slots 38 allow trough member 12 to be raised and lowered when bolts 36 are loose. A horizontal support member is fixedly attached between adjacent vertical support members 30 at each end of trough member 12. Horizontal support member 40 includes a generally cylindrical bearing portion 42, centrally disposed thereon. A bearing bolt 44 extends through bearing portion 42, and may be secured thereto by nuts 46 and 47. Bearing bolt 44 also extends through a threaded boss 48 on support bracket 50. Support bracket 50 is attached to strap 34. The height of trough member 12 above rollers 26 may be adjusted by loosening bolts 36 and adjusting nuts 46 and 47 on bearing bolt 44.

Referring now to FIG. 3, trough member 12 includes sidewalls 13. Sidewalls 13 have baseplate support members 52 attached thereto, and extending along the length thereof. A baseplate 54 is attached to support members 52 by countersunk bolts 56. Baseplate 54 includes slit 14 (See cut-away portion of FIG. 3) of trough member 12. Plates 56 and 58 extend along the length of baseplate 54 with their edges 60 and 62 generally parallel to slit 14. Plates 56 and 58 include elongated slots (not shown) extending in a direction perpendicular to slit 14. Bolts 57 and 59 extend through these slots for attaching plates 56 and 58 to baseplate 54. Plates 56 and 58 may completely or partially cover slit 14. As such, liquid flow through slit 14 may be regulated by adjusting the relative position of plates 56 and 58, i.e., by adjusting the effective slit width of slit 14. A practical range of effective slit widths for slit 14 may be between about 0.060 and 0.125 inches. The relative slit width may be adjusted by threaded bolts 64 located at each end of baseplate 54. Each bolt 64 extends through a nut 65 attached to bracket 66 on baseplate 54. Bolt 64 is also secured by nuts 68 and 69 to a bracket 70 attached to plate 58.

An etchant solution for etching a sheet of glass may be pumped into trough member 12 through any of apertures 20. The etchant solution will flow out of trough member 12 through slit 14. As such, the sheet of glass to be etched may be transported below trough member 12 to receive the etchant solution.

Figure 4:
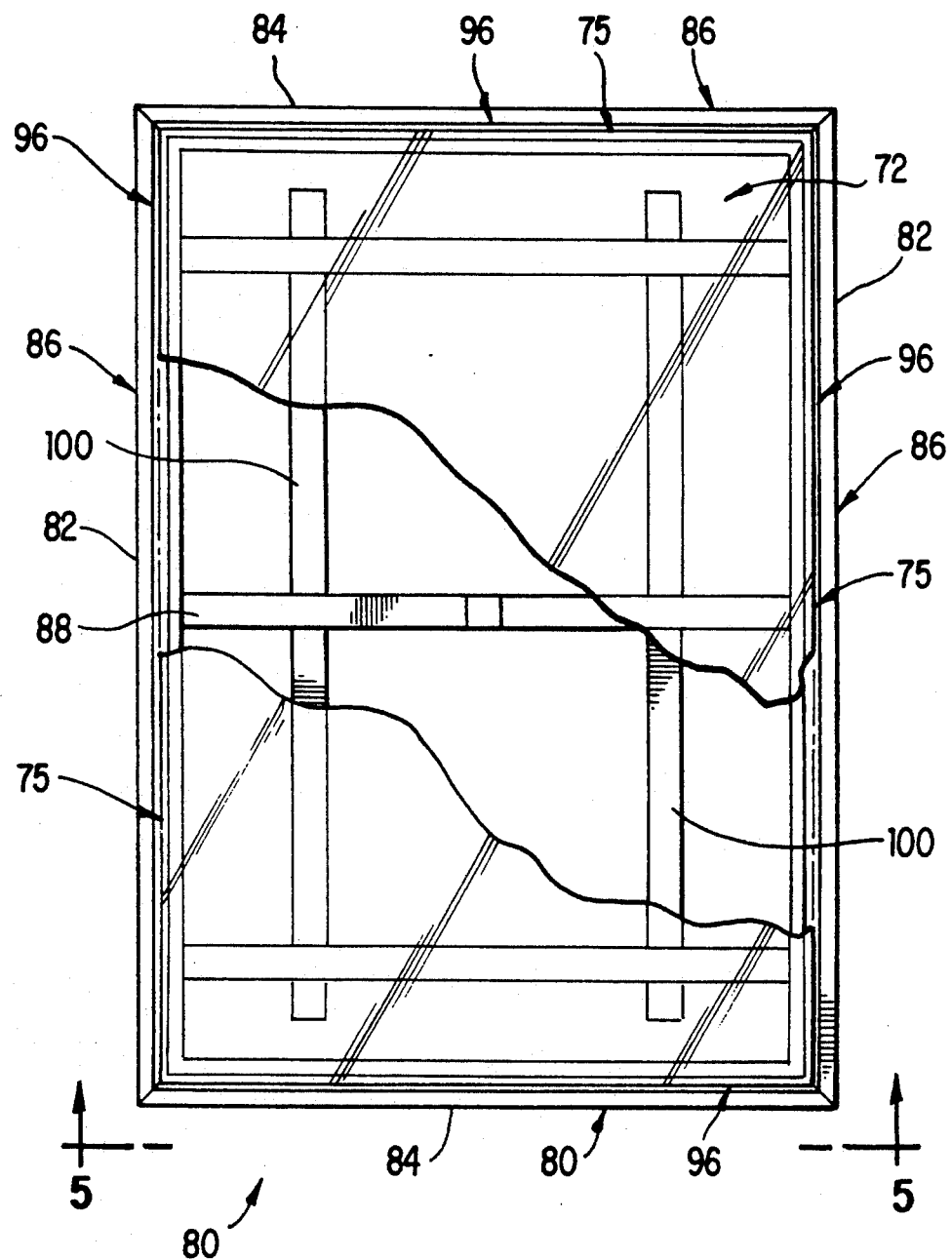
FIG. 4 schematically illustrates a plan view of a rack for transporting a sheet of glass to be etched by the apparatus of FIG. 1.
Figure 6:
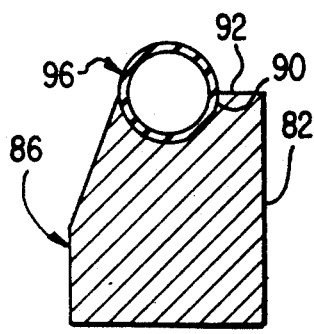
FIG. 6 is an enlarged cross-section of a frame member and seal of FIG. 5.
Figure 5:
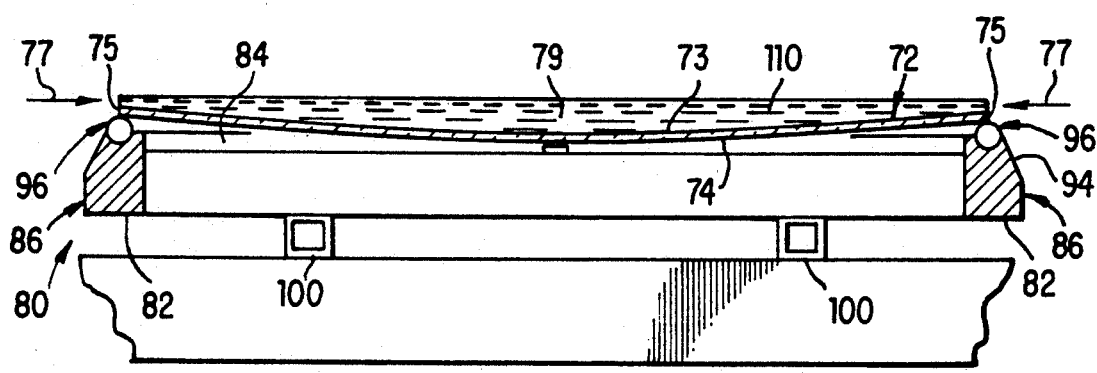
FIG. 5 is a cross-section view, illustrating a cross-section view, taken generally along line 5—5, of the rack of FIG. 4 and showing a nonuniform etchant layer on a sheet of glass.
Figure 7:
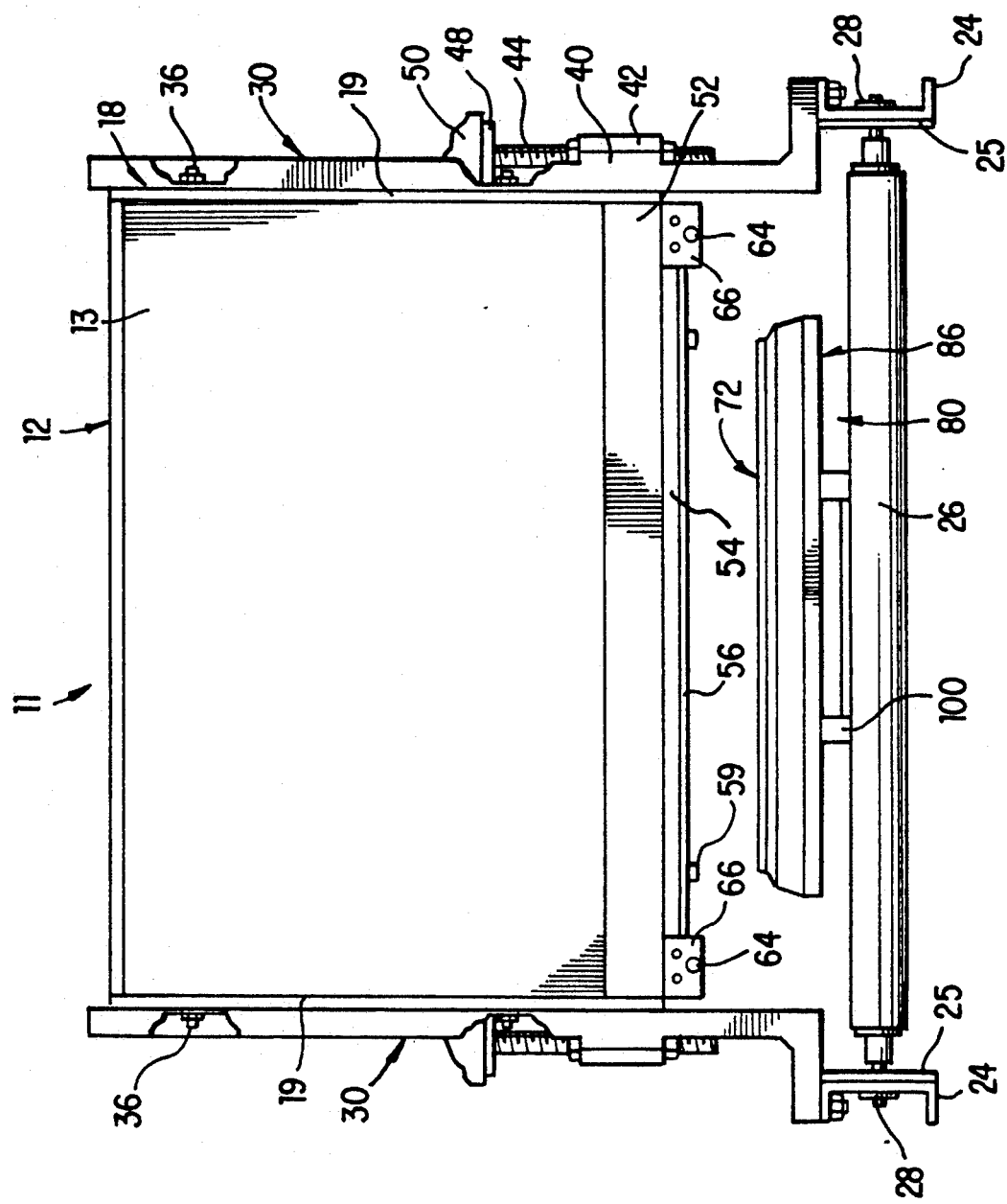
FIG. 7 schematically illustrates a front elevation of the apparatus of FIG. 1 showing the transporting rack of FIGS. 4 and 5.

Referring now to FIGS. 4, 5, and 7, a generally rectangular sheet of glass 72 may be transported on a rack 80. Rack 80 includes two longitudinal frame members 82 and two lateral frame members 84. Frame members 82 and 84 are joined to form a rectangular frame 86. Lateral braces 88 extend between longitudinal frame members 82. Referring now to FIG. 5, frame members 82 and 84 include a substantially half-cylindrical groove in upper surface 92 and a sloping outer surface 94. Frame members 82 and 84 are joined such that groove 90 extends continuously around frame 86. A seal 96 is bonded into groove 90. Seal 96 may be formed from flexible tubing having a diameter of about five-eighths of one inch. Seal 96 is preferably formed from tubing of synthetic rubber, for example a synthetic rubber commonly used for forming high vacuum seals and known by the generic name "viton", may be used. The tubing is preferably arranged such that seal 96 is continuous around frame 86 and forms a rectangle having generally the same average dimensions as glass sheet 72. Rack 80 includes two generally parallel spaced-apart beams. Beams 100 are attached the underside of lateral braces 88 and extend perpendicular thereto. Beams 100 and lateral braces 88 are preferably made from square section stainless steel tubing.

Glass sheet 72 is preferably placed on rack 80 such that its periphery 75 is supported on seal 96 and lies in a generally horizontal plane (77—77 in FIG. 5). As such, glass sheet 72 may sag under its own weight, such that upper surface 73 thereof assumes a generally concave shape. For example, a sheet of two millimeter thick float glass having a length of about thirty-six inches and a width of about twenty-four inches, thus supported, may sag such that surface 73 at its lowest point lies about three-thirtyseconds of one-inch below periphery 75.

To illustrate the function of the rack 80 and its importance in the etching process, a method of using the apparatus is set forth below.

An etchant solution is prepared. The viscosity of the etchant solution should be low enough that the etchant solution may flow across glass sheet 72 and find its own level, yet high enough that a nonuniform layer of the etchant at its lowest point may be thick enough to achieve the required predetermined degree of etch on uppermost surface 73.

A preferred etchant solution may comprise: about forty-eight percent sorbitol; about four-and-one-half percent ammonium bifluoride; about thirty percent concentrated hydrofluoric acid; and about seventeen-and-one-half-percent water.

The relatively high percentage of the sorbitol component provides the etchant solution with a higher viscosity than an etchant solution having only an aqueous base. The high percentage of sorbitol may also limit fuming of the etchant solution.

The etchant solution is pumped into trough member 12 as described above. Plates 56 and 58 are adjusted such that etchant solution flows through slit 14 at a rate significantly greater than is required to form a self-levelling layer completely covering uppermost surface 73. As such, some etchant solution will flow across uppermost surface 33 and over its edge (periphery) 75. For example, for a glass sheet travelling below slit 14 at a speed between about one hundred and one hundred-fifty feet per minute (ft/min) etchant preferably flows through slit 14 at a rate of about one cubic centimeter per second per linear inch (cc/sec/in).

Figure 5A:
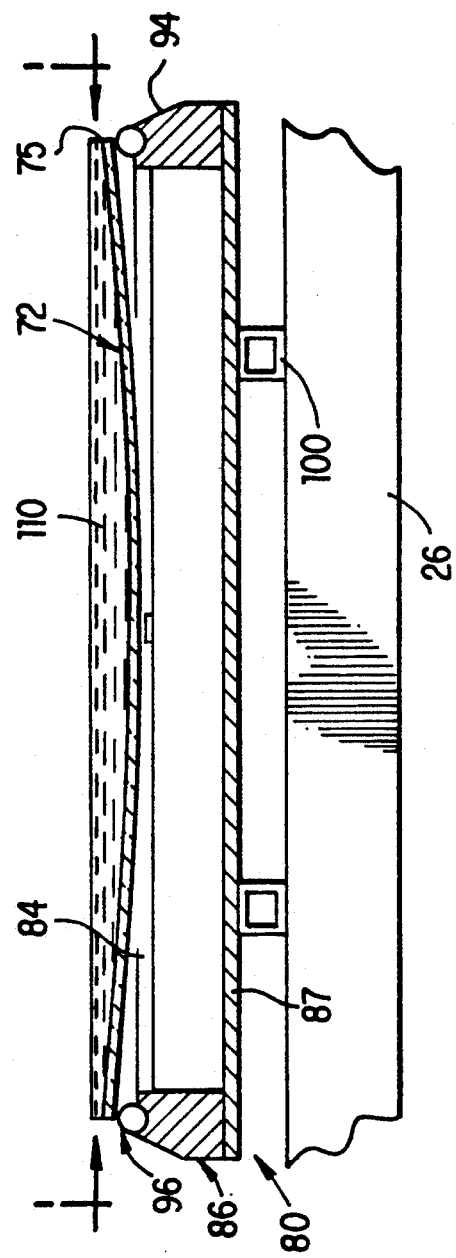
FIG. 5a is a cross-section view showing another arrangement of the rack of FIG. 4.

Seal 96 prevents overflowing etchant from reaching downward facing surface 74. Sloping surface directs the overflowing etchant away from frame 86 where it may be collected in a trough (not shown) and recirculated into trough member 12. In an alternative arrangement of rack 80 (See FIG. 5a) a base member 87, or base cover, may be attached to frame 86 to prevent etchant fumes from reaching surface 74 of glass sheet 72. Preferably the total rate of input of etchant solution into trough member 12 is such that a constant head of etchant solution is maintained therein. Generally, the etchant solution level is maintained just below the particular aperture 20 through which it is input into trough member 12. Preferably, etchant in trough member 12 is deep enough to create a pressure head of about thirty inches of water on base 16.

Etchant solution having the above specified properties may be applied to surface 73 by transporting glass sheet 72, mounted on rack 80 as described above, beneath coating head 11. The glass sheet is preferably transported at a rate between about one-hundred and one-hundred-fifty ft/min, and the height of slit 14 above the glass sheet between about three and six inches (in). Rack 80 is mounted supported by beams 100 on rollers 26. As such, downward facing surface 74 does not contact rollers 26, thus any etchant on the surface of rollers 26 may not be transferred to downward facing surface 74.

When etchant is applied to uppermost surface 73 as described above the etchant may form a nonuniform layer 10 thereon (See FIG. 5). Layer 110 will generally have a greatest thickness at about the central portion 79 of glass sheet 72 and the least thickness at about the periphery 75. Surface 73 will be etched at a rate which is a function of certain chemical properties of the etchant solution, which may be referred to as the potency of the solution. The etch rate will not significantly depend on the etchant layer thickness, provided that the minimum thickness of layer 110 is sufficient that a predetermined degree of etch is achieved without reducing the potency of the etchant solution. As such, nonuniform layer 110 may provide a uniform etch on uppermost surface 73 of glass sheet 75. It should be appreciated, however, that if a glass sheet 72 is not exactly flat, a uniform etch may only be possible if the sheet sags sufficiently that no point on the glass sheet is at a higher level than the periphery 75 of the sheet If a sheet of glass to be etched has outer dimensions (length or width) sufficiently large, or a thickness sufficiently thin, self-weight sag of the sheet may be excessive. For example its upper surface may become sufficiently concave, i.e., local slope may be sufficiently steep, that a desired minimum layer thickness may not be obtained, or its edge may not seal correctly on seal 96. In such a case it is preferable to provide means to prevent excess sag, for example, a stop 112 (See FIGS. 4 and 5) for supporting the center portion of a sheet at a predetermined level.

It will be appreciated that an effective curtain etching method preferably includes means for stopping the etching process after a predetermined degree of etch has been achieved. Generally etchant solution may be removed from the glass surface after about thirty seconds (sec). Etching may be arrested by rinsing the etchant from the glass sheet, blowing the etchant off the surface using an air knife or sucking the etchant from the surface using a vacuum arrangement. If a rinse is employed to stop the etch, it is still preferable to dry the rinsed surface rapidly.

Figure 8:
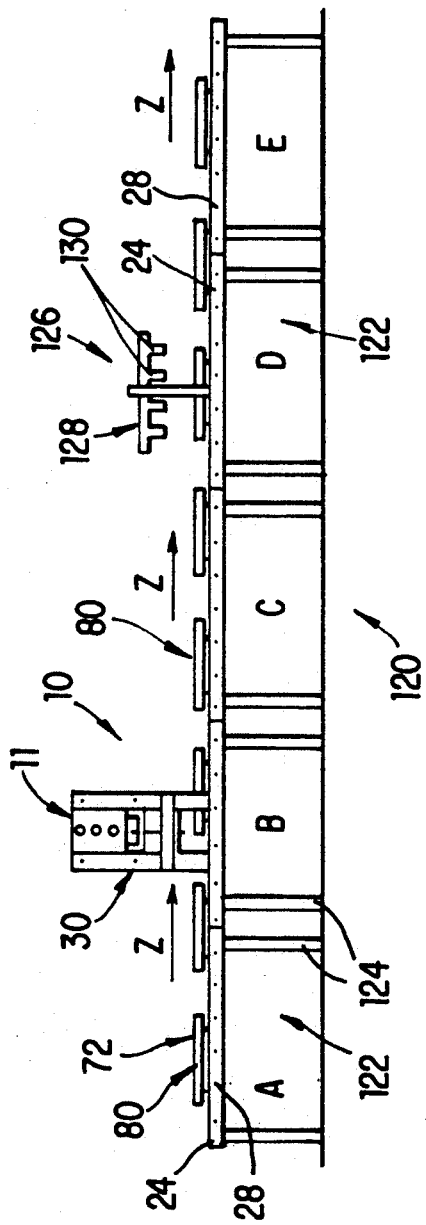
FIG. 8 schematically illustrates an etching production line including the apparatus of FIG. 1.
Figure 9:
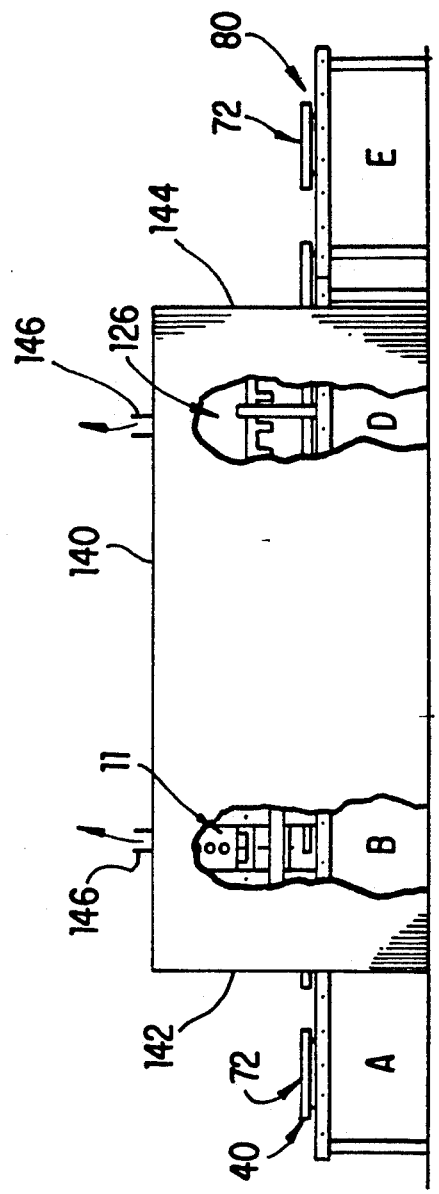
FIG. 9 schematically illustrates the production line of FIG. 8, wherein the apparatus of FIG. 1 is located in a ventilated enclosure.

Referring now to FIGS. 8, a production line 120 may include a series of conveyor units 122 arranged end-to-end. Conveyor units include vertical legs 124 for supporting side members 24. Side members 24 support rollers 26 (not shown) mounted in bearings 28 (See FIGS. 1 and 2). Conveyor units such as units 122 may be obtained, for example, from Billco Manufacturing, Inc., of Zelinople, Pa. A glass 72 may be loaded on to a rack 80 at conveyor unit A. Rack 80 may then be transported beneath coating head 11 to receive a layer of etchant solution. Coating head 11 is mounted on conveyor unit B. The glass sheet, including the layer of etchant solution may then be transported to conveyor unit C where it may remain long enough for glass sheet 72 to be etched to a predetermined degree. Glass sheet 27 may then be transported to conveyor unit D for removal of the layer of etchant solution. Conveyor unit D may include a rinsing apparatus 126. The rinsing apparatus may include a manifold 128 having a plurality of nozzles 130 for directing a rinsing fluid onto glass sheet 72. Following the rinsing step at conveyor unit D the glass sheet may be transported to conveyor unit E where it may be inspected, unloaded, or further transported to a drying apparatus (not shown). It will be appreciated that etchant solutions generally release fumes which may be hazardous. Accordingly it may be necessary to provide means for removing hazardous fumes from production line 120 and from its vicinity. This may be accomplished, for example, by surrounding at least conveyor units B, C, and D, including coating head 11, and rinsing apparatus 126 with an enclosure 140. Enclosure 140 is provided with openings (not shown) in ends 142 an 144 to permit the transport of glass, and with means to exhaust hazardous fumes, for example, through ducts 146.

The present invention has been described in terms of a preferred embodiment and other embodiments. The invention, however, is not limited to the embodiments described and depicted. Rather, the scope of the invention is defined by the appended claims.

What is claimed is:

1. Apparatus for applying an etchant solution to a surface of a glass sheet, comprising:

means for applying the etchant solution to the glass sheet, said applying means including an elongated trough having a base including a slit extending lengthwise therein;

means for transporting the glass sheet at a distance beneath said applying means to receive the etchant solution, said transporting means including means for supporting the glass sheet in a generally horizontal position with a first surface thereof facing uppermost and a second surface thereof facing downward;

said supporting means configured such the glass sheet, when supported thereon, may sag under its own weight, whereby said first surface assumes a generally concave form.

2. The apparatus of claim 1 further including removing means for removing etchant solution from said first surface.

3. The apparatus of claim 1 wherein said trough has a depth of about thirty inches.

4. The apparatus of claim 3 wherein said trough has two ends and at least one of said ends includes a plurality of apertures disposed at different heights therein.

5. The apparatus of claim 4 further including means for regulating liquid flow through said slit.

6. The apparatus of claim 5 further including means for adjusting the distance of said applying means over the glass sheet.

7. The apparatus of claim 1 wherein said trough is surrounded by an enclosure.

8. The apparatus of claim 1 wherein said supporting means includes means for preventing said etchant solution from contacting said second surface.

9. The apparatus of claim 1 wherein the glass sheet has a generally rectangular periphery and said supporting means is configured to support the glass sheet at said periphery.

10. The apparatus of claim 9 wherein said supporting means includes a generally rectangular seal for sealing said sheet of glass about its periphery.

11. A method for etching a surface of a glass sheet, comprising:

providing an etchant solution;

providing an elongated trough, said trough having a base including a slit extending along the length thereof, said slit having a width such that said liquid may flow therethrough at a predetermined rate;

providing a glass sheet, said glass sheet having a first surface a second surface a center portion and a periphery;

supporting said glass sheet at said periphery with said periphery in a generally horizontal plane and with said first surface uppermost, such that said first surface assumes a generally concave form;

pumping said etchant solution into said trough such that a predetermined depth of said etchant solution is maintained therein and said etchant solution flows through said slit at said predetermined rate; and transporting said sheet of glass beneath said slit such that said etchant solution flows from said slit over said first surface to form a nonuniform layer of said etchant solution thereon, said layer having a minimum thickness at said periphery.

12. The apparatus of claim 11 further including removing said film of etchant solution from said glass sheet after a predetermined time.

13. The method of claim 11 further including providing a seal at said periphery for preventing said etchant solution from contacting said second surface.

14. The method of claim 11 wherein said predetermined depth is such that said etchant solution exerts a pressure of at least about 30 inches of water on said base.

15. The method of claim 11 wherein said etchant solution includes means for increasing the viscosity thereof.

16. The method of claim 15 wherein said viscosity increasing means includes sorbitol.

17. The method of claim 11 wherein said etchant solution includes about 48 percent sorbitol, about 4.5 percent ammonium bifluoride, about 30 percent concentrated hydrofluoric acid, and about 17.5 percent water.

* * * * *